United States Patent [19]

Erickson

[11] Patent Number: 4,585,217
[45] Date of Patent: Apr. 29, 1986

[54] WORKPIECE SUPPORT APPARATUS AND METHOD

[76] Inventor: Robert W. Erickson, 209 Johns St., North Aurora, Ill. 60542

[21] Appl. No.: 534,184

[22] Filed: Sep. 20, 1983

[51] Int. Cl.$^4$ .......................... B23Q 3/06; B23D 7/08
[52] U.S. Cl. ....................................... 269/56; 269/71; 269/900; 409/219; 409/226
[58] Field of Search ........ 409/131, 132, 903, 163–167, 409/221–225, 226, 171, 174, 219, 220; 269/55, 56, 71, 73, 81, 309, 310, 900; 198/648; 29/1 A; 408/71, 87, 89, 90; 83/267, 411 R, 412, 414, 733

[56] References Cited

U.S. PATENT DOCUMENTS

| | | | |
|---|---|---|---|
| 2,558,283 | 6/1951 | Wharton et al. | 409/221 X |
| 3,588,989 | 6/1971 | Hosea | 29/407 |
| 3,790,153 | 2/1974 | Seidenfaden | 269/21 |
| 3,830,485 | 8/1974 | Mickelsson et al. | 409/225 X |
| 3,967,816 | 7/1976 | Ramsperger et al. | 269/900 X |
| 4,073,215 | 2/1978 | Coope et al. | 409/219 |
| 4,286,778 | 9/1981 | Follmeyer | 409/225 X |
| 4,477,064 | 10/1984 | DiGiulio | 269/231 |

OTHER PUBLICATIONS

"The Mid-State Tombstone", Mid-State Machine Products, Inc., Advertisement in *Modern Machine Shop*, Jun. 1981, p. 250.

"Keys to Machining Center Palletization" by Ken Gettelman, in *Modern Machine Shop*, Mar. 1982, pp. 61–64.

*Primary Examiner*—Gil Weidenfeld
*Assistant Examiner*—Steven C. Bishop
*Attorney, Agent, or Firm*—Cahill, Sutton & Thomas

[57] ABSTRACT

Four square tooling plates each have an outer surface on which a plurality of workpieces are attached. The inner face of each tooling plate is precisely attached to a respective vertical surface of a rectangular block by means of a dowel extending into geometrically centered holes in the vertical face of the block and the tooling plate. Precise rotational alignment of the tooling plate with the block is achieved by a peg extending from the vertical face of the block into a timing hole in the tooling plate spaced from the center hole thereof. The block, with workpiece-loaded tooling plates thereon, is lowered onto a rotary table so that a geometric axis of the block is perfectly aligned with the rotational axis of the rotary table. Rotational alignment of the block with the rotary table is achieved by mating of keys extending from the bottom of a base plate of the block into keyways in the surface of the rotary table. A numerically controlled machining device automatically machines each workpiece on the first tooling plate, causes rotation of the rotary table by 90 degrees, machines the workpieces on the second tooling plate, again indexes the rotary table 90 degrees, etc. After all workpieces have been machined, the block is lifted from the surface of the rotary table and immediately replaced with another block supporting four more workpiece-loaded tooling plates, which are being machined while the already-machined workpieces are removed from the first set of tooling plates.

2 Claims, 13 Drawing Figures

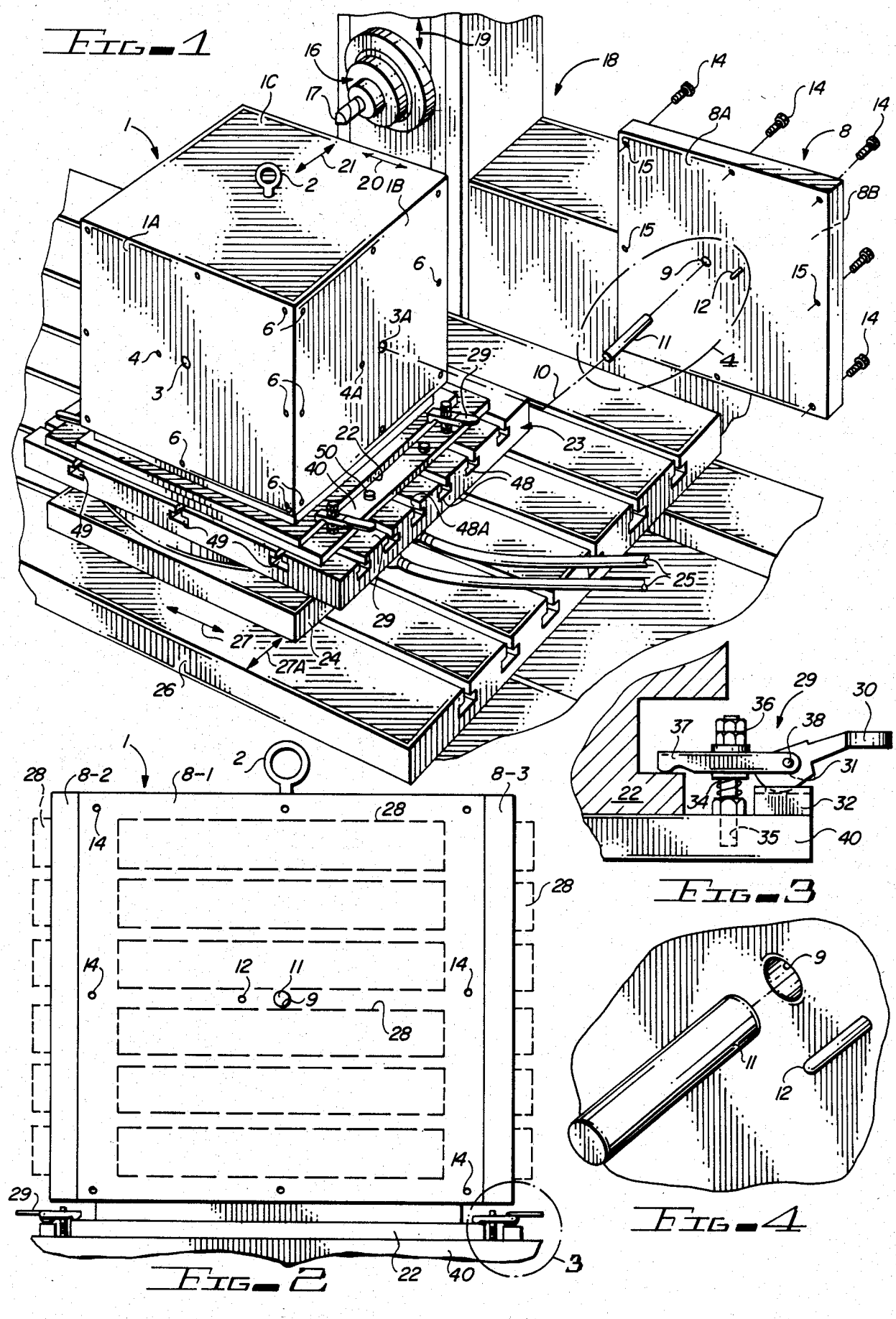

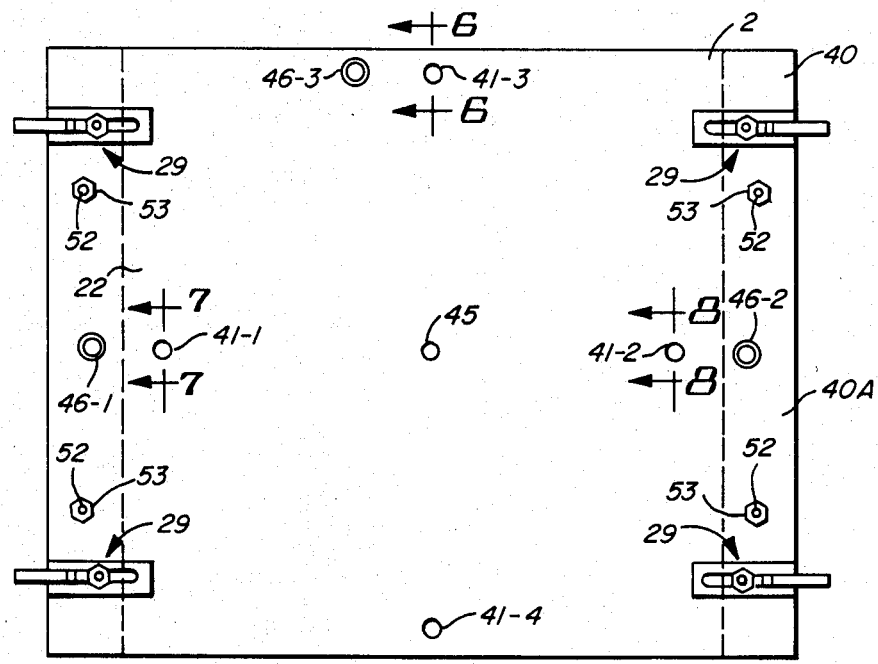
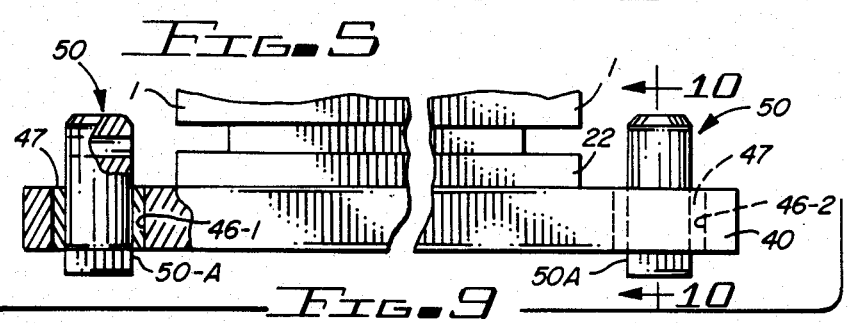
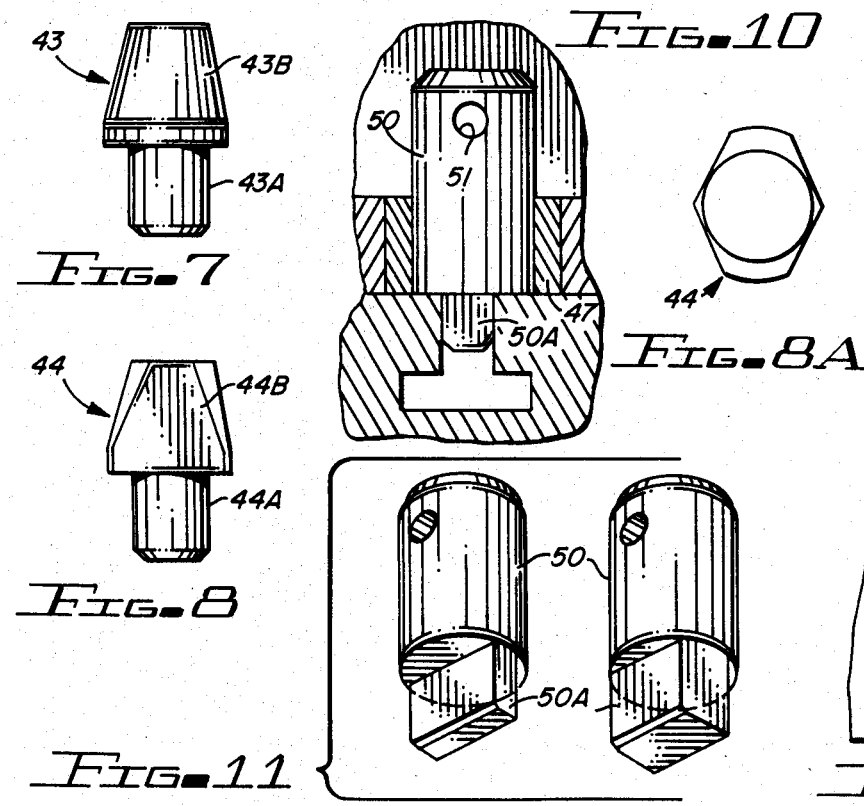

WORKPIECE SUPPORT APPARATUS AND METHOD

BACKGROUND OF THE INVENTION

The invention relates to devices for supporting and presenting a plurality of workpieces to the machining or cutting element of a automatic machining device.

Recently, numerically controlled machining devices have become widely used. These devices are able to perform pre-programmed machining and drilling operations on workpieces very precisely and at very high speeds. Various stable fixturing systems, tooling blocks, and angle plates have been utilized to support one or more workpieces while the numerically controlled machining tool is performing its pre-programmed operations on the workpieces. However, when the numerically controlled machining device has completed its operations on all workpieces presented to it by a workpiece-supporting fixture, operation must be halted while the machined workpieces are removed from the fixture and unmachined workpieces are then attached to the fixture, or while a pre-loaded fixture is being aligned with and attached to the machining device. Since numerically controlled machining equipment is exceedingly expensive, it is very desirable to be able to keep it operating as close to one hundred percent of the time as possible. The time that the numerically controlled machining device remains idle while workpieces are being handled represents a loss in efficiency of use of the machine, and ultimately a loss in profitability of the workpieces or an increase in their cost.

Accordingly, it is an object of the invention to provide an improved workpiece-supporting apparatus that increases the number of workpieces that can be presented to the machining element of a numerically controlled machining tool by a single supporting device.

The previously known workpiece supporting blocks, such as ones manufactured by Mid-State Machine Products, Inc., of Winslow, Me., make four surfaces available for different workpiece setups. However, the different sides of the tooling blocks are used for different "backup jobs" which can be run if there is a problem with the control program or a delay in obtaining workpiece material for the present job. These tooling blocks do not increase the percentage of time that the numerically controlled machine device spindle is operating as much as would be desirable. Furthermore, it is inconvenient to maintain a sufficiently large supply of such tooling blocks to make it practical to efficiently preload a large number of workpieces.

Accordingly, it is another object of the invention to provide an improved apparatus and method for presenting workpieces to the spindle of a numerically controlled machining device during a higher percentage of the time than is accomplished by the closest known prior art tooling blocks.

It is another object of the invention to provide an improved method and apparatus to achieve efficient "pre-loading" of a large inventory of un-machined workpieces onto support elements for presenting the un-machined workpieces to the spindle of a numerically controlled machining device.

A variety of rotatable workpiece holders are shown in U.S. Pat. Nos. 3,336,828; 3,588,989; 3,830,485; 4,200,182 and 4,286,778.

SUMMARY OF THE INVENTION

Briefly described, and in accordance with one embodiment thereof, the invention provides an improved apparatus and method for presenting a plurality of workpieces to the machining element of a numerically controlled machining device wherein a plurality of workpieces are rigidly attached to each of a plurality of faces of a geometrically symmetrical main support element. The support element then is lifted by means of a crane and lowered onto the surface of a rotary table so that a geometric axis of the main support element is precisely aligned with the rotational axis of the rotary table, a plurality of key elements extending from the bottom of the main support element and fitting precisely into keyways in the upper surface of the rotary table to accomplish precise positioning of the main support element, and hence the workpieces, with respect to the rotary table and a spindle of the numerically controlled machining device. After all of the workpieces attached to a first face of the main support element have been machined by a spindle-driven machining element, the rotary table is rotated or indexed through an angle which presents to the spindle a plurality of workpieces attached to the adjacent surface of the main support element in precisely the same predetermined relative position as the workpieces attached to the first face were earlier presented to the spindle. This procedure is repeated until all workpieces connected to all faces of the main support element have been machined. Then the main support element, with the workpieces still attached thereto, is lifted by means of a crane, set aside, and another workpiece-loaded main supporting element is aligned with and positioned on the rotary table. The foregoing procedure then is repeated. In this manner, the spindle of the numerically controlled machine is kept operating continuously except while loaded main support elements are being lifted from and lowered onto the rotary table. Meanwhile, workers can efficiently maintain a supply of workpiece-loaded main support elements ready for positioning on the rotary table, and can remove machined workpieces from main support elements which have been removed from the surface of the rotary table. In the described embodiment of the invention, the workpieces are attached to the respective four vertical faces of a cubic main support element by means of four square tooling plates, the inner faces of which are laterally and vertically aligned with corresponding faces of the cube by means of a dowel extending into geometrically centered holes in the faces of the cube and the corresponding inner surfaces of the tooling plates. The outer surfaces of the tooling plates are "custom-machined" so as to facilitate convenient, precise positioning and attachment of un-machined workpieces thereto. A supply of the tooling plates is kept preloaded with un-machined workpieces, which then can be rapidly and precisely aligned with and attached to the four vertical faces of the cube. Rotational alignment of each tooling plate with a vertical face of the cube is accomplished by means of a peg or dowel extending out of the face of the cube into a correspohding timing hole in the tooling plate. The timing hole is spaced from the center hole on the inner surface of that tooling plate. Precise positioning of the cube on the surface of the rotary table is accomplished by means of at least three removable key-plugs having precise keys on the bottom thereof which precisely fit into keyways in the surface of the rotary table. Bolts are provided for engaging a flange of a baseplate which is attached to the cube and drawing the base plate tightly against the upper surface of the rotary table. Alignment of the base plate to the cube is accomplished by means of tapered plugs extending from the upper surface of the base plate into precisely positioned holes in the bottom of the cube. The base plate is attached to the bottom of the cube by means of clamps which are attached to the periphery of the base plate and engage the lip of a flange of the bottom of the cube. The key-plugs extend through holes in the periphery of the base plate. The aligned base plate is attached to the surface of the rotary table by nuts on threaded studs extending up from slideable keys that engage T-shaped keyways in the surface of the rotary table.

BRIEF DESCRIPTION OF THE DRAWINGS

FIG. 1 is a perspective view illustrating the rotary table, support block, and tooling plates of the invention.

FIG. 2 is an elevation view of the main support plates attached and bolted to the block with tooling surface of the rotary table. FIG. 3 is an enlarged elevation view of detail 3 of FIG. 2. FIG. 4 is an enlarged view of detail 4 of FIG. 1. FIG. 5 is a top view of the base plate of the cubic support shown on FIG. 1. FIG. 6 is a section view taken along section line 6-6 of FIG. 5. FIG. 7 is a section view taken along section line 7-7 of FIG. 5. FIG. 8 is a section view taken along section line 8-8 of FIG. 5. FIG. 8A is a top view of FIG. 8. FIG. 9 is a partial section view illustrating removable keys extending from the bottom of the base plate of the cubic block shown in FIG. 1. FIG. 10 is an enlarged section view taken along section line 10—10 of FIG. 9. FIG. 11 shows a perspective view of two removable key-plugs having different sized keys. FIG. 12 is a partial bottom view of FIG. 9 shown in FIG. 1 illustrating two of the key-plugs.

DESCRIPTION OF THE INVENTION

Referring now to the drawings, particularly to block 1 has four vertical faces, FIG. 1, a solid cubic including front face 1A and side face 1B. Cubic block 1 also includes a top surface 1C. An eyelet 2 is attached to the geometric center of the square top surface 1C to facilitate lifting of cubic block 1 by means of a crane or the like. Square front face 1A includes a precisely cylindrical center hole 3 bored in the geometric center of square face 1A and perpendicular thereto. A smaller timing hole 4 is drilled into front face 1A perpendicularly thereto. As subsequently explained, timing hole is used to effectuate very precise rotational alignment of a tooling plate onto the square front surface 1A of block 1 after the tooling plate has been positioned on a dowel such as 11 extending into center hole 3. Along each edge of front face 1A there are three threaded holes such as 6, into which cap screws can be screwed to rigidly attach a tooling plate to front face 1A after that tooling plate has been precisely aligned by means of a dowel such as 12 that extends into timing hole 4 or 5.

Reference numerals 3A and 4A respectively designate a corresponding center hole and timing hole that are bored perpendicularly into side face 1B of block 1. Threaded holes 6 are also disposed in side face 1B. The respective locations of the center holes, timing holes, and threaded holes are identical on all four faces of block 1.

Reference numeral 8 designates one of four removable tooling plates that are aligned with and tightly attached to the four vertical walls of cubic block 1 during operation of numerically controlled machining device 18. Tooling plate 8 has an inner surface 8A and an outer surface 8B. A cylindrical hole 9 of the same diameter as each of the center holes such as 3 and 3A is bored perpendicularly into the geometric center of inner face 8A. The side dimensions of tooling plate 8 are identical to the side dimensions of the edges of cubic block 1.

As indicated by dashed line 10 in FIG. 1, tooling plate 8 can be aligned with side face 1B of cube 1 by first inserting cylindrical dowel 11 into hole 3A. The tolerance between hole 3A and dowel 11 is approximately one thousandth of an inch. Since the diameter of center hole 9 in tooling plate 8 is identical to the diameter of center hole 3A of block 1, when tooling plate 8 is positioned on dowel 11, both the vertical and horizontal position of the center of tooling plate 9 is very precisely established relative to the position of cube 1. Then in order to obtain perfect alignment of tooling plate 8, it is simply necessary to rotate tooling plate 8 on dowel 11 until peg or dowel 12 (see FIG. 4) is aligned with hole 4A of block face 1B. At this point the inner face 8A of tooling plate 8 can be pressed tightly against cube face 1B.

Next, a plurality of cap screws such as 14 are inserted through clearance holes 15, which are perfectly aligned with threaded holes 6 in cube face 1B. Cap screws 14 are then tightened to force tooling plate 8 tightly against cube face 1B. In a similar manner, three other tooling plates such as 8 are precisely affixed to the three other vertical faces of block 1.

At this point it should be appreciated that each of the four above mentioned tooling plates has its outer face 8B suitably machined, and provided with suitable threaded holes to bolt or clamp certain predetermined unmachined work pieces to the outer face of that tooling plate. It should be understood that the purpose of cubic block 1, with the four tooling plates 8 attached thereto, is to support a large number of un-machined work pieces in very precise position relative to the spindle 16 and its cutting bit 17. Spindle 16 and cutting bit 17 are part of the numerically controlled machining device 18. Spindle 16 is automatically controlled in accordance with a stored program of instructions to move vertically in the directions indicated by arrows 19, i.e., in the Y direction. Spindle 16 can also be moved in the X direction indicated by reference numeral 20, and in and out in the Z direction indicated by reference numeral 21.

Block 1 has a base plate 40 rigidly clamped to its bottom flange 22 (in a manner subsequently explained). Base plate 40 rests on the upper surface of a rotary table 23. Rotary table 23 can be precisely rotated about its base 24 in response to a pair of pneumatic control lines 25. Base 24 is engaged with a machine table 26 and is controllably and very precisely moveable in the X and Y directions indicated by reference numerals 27 and 27A, respectively, in FIG. 1.

In FIG. 2, which is a side view of the device shown in FIG. 1 with three tooling plates designated by reference numerals 8-1, 8-2 and 8-3 fastened to the respective faces of block 1 by means of cap screws 14. In FIG. 2, the shapes indicated by dotted lines such as 28 represent un-machined workpieces which have been attached by means of screws or clamps (not shown) to the outer surfaces of the tooling plates 8-1, 8-2 and 8-3. If desired, suitable machining of the outer surfaces of the three tooling plates is performed in order to make particular workpieces 28 fit precisely in their desired positions on the tooling plates.

As shown in FIGS. 1-3, a base flange 22 is clamped to the upper surface of base plate 40 by means of a plurality of clamping devices 29. The details of clamping devices 29 are shown in FIG. 3, wherein clamping device 29 includes a lever handle 30 having an offset cam surface 31 which slides along a camming surface of block 32 as handle 30 is moved up and down. The threaded stud 34 is securely installed in a hole 35 in the upper surface of rotary table 23. A pair of nuts 36 on the upper end of stud 34 function as a fulcrum for a lever arm 37, the right hand end of which is pivotally connected by axel 38 to cam 31. The left end of arm 37 tightly engages the upper lip surface of base plate 40 as handle 30 is lifted.

The manner of precise alignment of the base of cube 1 with base plate 40 is best described with reference to FIGS. 5-8. First, note that the top surface 40A of base plate 40 has four holes 41-1, 41-2, 41-3 and 41-4 therein. Two of the plugs 42 shown in FIG. 6 each have a cylindrical stem portion 42A which precisely fits into holes 41-3 and 41-4. Each of the plugs 42 also includes a dome-shaped upper portion 42B which extends above the upper surface 40A of base plate 40. The bottom surface of block 1 has two holes that are precisely axially aligned with holes 41-3 and 41-4. These two holes are cylindrical, and have a diameter approximately one mil greater than the diameter of the base portion of dome portion 42B. As block 1 is lowered onto the upper surface of base plate 40 prior to being clamped thereto by means of clamps 29, the rounded upper surface of dome portions 42B initially extending to the two corresponding holes in the bottom surface of cube 1 to facilitate initial alignment of cube 1 with base plate 40.

An alignment plug 43 shown in FIG. 7 having a cylindrical stem portion 43A and a frusto-conical upper portion 43B has its stem portion 43A placed in hole 41-1 of base plate 40. The upper portion 43B extends into a corresponding hole (not shown) in the bottom of block 1 that precisely fits and receives portion 43B of plug 43 as block 1 is lowered onto the upper surface of base plate 40. Similarly, another alignment plug 44 shown in FIG. 8 has a cylindrical stem 44A that fits precisely into hole 41-2 in base plate 40. The upper portion 44B of plug 44 fits into a corresponding hole in the bottom of block 1.

FIG. 8A shows a top view of alignment plug 44. Tapered upper portions 43B and 44B of plugs 43 and 44, respectively, aid in automatically, precisely aligning block 1 with respect to the upper surface of base plate 40 as block 1 is lowered thereon.

Next, the manner of precisely aligning base plate 40 onto the upper surface of rotary table 23 is described with reference to FIGS. 5 and 9-12. Referring now to FIG. 5, base plate 40 also has a precisely centered hole 45 therein and at least 3 other holes 46-1, 46-2 and 46-3 therein. The latter three holes have bushings such as 47 (FIG. 9) therein. At this point, note that the upper surface of rotary table 23 has a plurality of T-slot keyways such as 48 therein and also has a plurality of similar orthogonal T-slot keyways 49 therein.

Key-plugs 50 are inserted into the bushings 47 in holes 46-1, 46-2, and 46-3. Each of key-plugs 50 has a rectangular key extension 50A extending from its bottom surface, the upper portion of each key-plug 50 being cylindrical. The width of each of the key sections 50A is selected to precisely match the width of the upper portion of the keyways 48 and/or 49 in the upper surface of rotary table 23. More specifically, the one of the key-plugs 50 inserted into hole 46-2 has its lower key portion 50A extending into keyway A (FIG. 1) of rotary table 23. Similarly, the key-plug 50 inserted into hole 46-1 also has its lower key portion 50A extending into keyway 48A. This prevents any rotation or movement of block 1 in the direction of arrows 21 (FIG. 1), but does not prevent lateral movement in the direction of arrows 20. In order to prevent movement of block 1 in the direction of arrows 20, another key-plug 50 must be provided with its key 50A in one of the keyways 49. This particular key-plug can fit in hole 46-3 in baseplate 40. FIG. 12 shows a bottom view of FIG. 9, and dotted lines 48A indicate the location of keyway 48A.

The horizontal holes 51 (FIG. 10) in the key-plugs can be used for receiving a rod, handle or the like to facilitate pulling the key-plugs out of the holes of bushings 47 if it is necessary to change the key-plugs.

In FIG. 11, which shows perspective views of two key-plugs 50, the key portions 50A are shown in different sizes to illustrate an advantage of this method of keying, namely, that the same base plate 40 can be used in conjunction with a wide variety of different rotary table surfaces having different width keyways simply by inserting key-plugs 50 having the needed width of key section 50A.

Note that a geometrically centered hole 45 extends through base plate 40 as shown in FIG. 5. If rotary table 5 has a vertical shaft about which it rotates extending upward from the upward surface thereof, that shaft can be extended into hole 45 to precisely laterally align base plate 40 with rotary table 23 so that a geometric axis of cube 1 is perfectly aligned with the axis of rotation of rotary table 23. In this case, one less key-plug 50 is needed.

Base plate 40 also has four holes through which four threaded studs 52 respectively extend from T-shaped slides that fit within and conform to the shape of two of the keyways 48 in rotary table 23. Hex nuts 53 are threaded onto the upper ends of studs 52 to securely tighten base plate 40 against the upper surface of rotary table 23.

Preferably, the blocks 1 are made of 10-18 or 10-20 "mild steel" or low carbon steel. Block 1 is preferably constructed on a cubic or rectangular frame with one inch thick plates forming the outer surface of block 1. Tooling plates 8 are preferably made of the same steel material, and are preferably approximately one inch thick.

While the invention has been described with reference to a particular embodiment thereof, those skilled in the art will be able to make various modifications to the disclosed embodiment of the invention without departing from the true spirit and scope of the invention. It is intended that elements and method steps which perform substantially the same function in substantially the same way to achieve substantially the same result are encompassed by the present invention. For example, it is not at all essential that block 1 really be cubic. For example, the height of its sides could be substantially greater than their width without affecting operation in any way while allowing more workpieces to be mounted on the outer surfaces of the tooling plates 8, which in this case would be rectangular so as to fit precisely on the outer side surfaces of the rectangular block. Furthermore, there is no basic requirement that the block 1 has a square horizontal cross-section. For example, the cross-section could be hexagonal, in which case it would be necessary to index rotary table 23 by 60 degrees, rather than 90 degrees in order to expose a new set of unmachined workpieces to spindle 16 after the workpieces on the prior tooling plate have been machined. It should be noted that there is no basic requirement that the outer surfaces of the support element shown as a cube in the drawings even be flat. For example, the support element could be cylindrical, if suitable means are provided for precisely attaching the inner surfaces of the tooling plates thereto. Part of the outer surface of the support element may even be spherical, and, in fact, the outer surfaces of the tooling plates may also be cylindrical or spherical in certain instances, so that a point of the workpiece can be moved in an arcuate path past the cutting element of the machining device And, of course, it is not essential that the machining device be automatically controlled; the workpiece supporting apparatus and method of the present invention will provide many of the same advantages regardless of whether the machining device is manually or automatically controlled.

I claim:

1. A workpiece supporting apparatus comprising in combination:
   (a) a plurality of tooling plates each having a flat inner surface, an outer surface for supporting a plurality of un-machined workpieces, and a plurality of peripheral clearance holes;
   (b) a symmetrical tooling block for supporting a plurality of said tooling plates, each tooling plate supporting a plurality of said un-machined workpieces, said tooling block including a plurality of flat outer surfaces that define a symmetrical polygon, said tooling block including an eyelet attached to the top of said tooling block to effectuate lifting of said tooling block by means of a crane, said tooling block including a bottom flange and also including a plurality of peripheral threaded holes for receiving a plurality of cap screws extending through said clearance holes;
   (c) first aligning means for precisely aligning each of said tooling plates with a respective flat outer surface of said tooling block and rigidly, removably attaching that tooling plate to that flat outer surface, said first aligning means including a plurality of dowels, each of said dowels extending perpendicularly out of a precision hole in the center of each of said flat outer surfaces of said tooling block, each of said tooling plates having a precisely centered hole in its flat inner surface for receiving a respective one of said dowels to align that tooling plate to said tooling block, said first aligning means also including timing means for locking each tooling plate into precise rotational alignment with edges of said tooling block, said timing means including a pin in each flat outer surface of said tooling block and spaced from the dowel extending from that flat outer surface and a corresponding timing hole in said flat inner surface of that tooling plate for receiving that pin when that tooling plate is precisely rotationally aligned with said tooling block;
   (d) second aligning means for effectuating precise aligning of said tooling block with a rotary table so that a longitudinal axis of said symmetrical polygon is coaxial with an axis of rotation of said rotary table and for rigidly attaching the aligned tooling block in fixed relationship with said rotary table, said second aligning means including a base plate attached to the bottom of said tooling block, said tooling block having three holes in a bottom surface thereof, said base plate having three holes in an upper surface thereof and defining a triangle, said second aligning means including three removable upper alignment keys in said three holes of said upper surface of said base plate, respectively, each of said upper alignment keys having a tapered upper surface to effectuate initial aligning of said tooling block with said base plate as said tooling block is lowered onto said base plate, said second aligning means further including three removable lower keys defining a triangle and having rectangular portions extending downward from the bottom of said base plate to engage keyways in the upper surface of said rotary table, whereby a plurality of said tooling plates can be pre-loaded with un-machined workpieces, and a plurality of those pre-loaded tooling plates can be attached to said flat outer surfaces of a plurality of said tooling blocks, one of which then can be attached to said rotary table, which rotary table then can be rotationally indexed to sequentially present each of said tooling plates and un-machined workpieces thereon to the spindle of a numerically controlled machining device, wherein that tooling block later can be rapidly removed and replaced by another tooling block with tooling plates and un-machined workpieces thereon, to thereby maximize operating time of the numerically controlled machining device.

2. The workpiece supporting apparatus of claim 1 wherein said base plate has a precisely centered hole for receiving a shaft about which said rotary table rotates.

* * * * *